(12) United States Patent
Tsai

(10) Patent No.: US 11,955,918 B2
(45) Date of Patent: Apr. 9, 2024

(54) MOTOR DRIVER HAVING STARTUP ADJUSTING MECHANISM

(71) Applicant: ANPEC ELECTRONICS CORPORATION, Hsinchu (TW)

(72) Inventor: Ming-Jung Tsai, Changhua County (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 160 days.

(21) Appl. No.: 17/860,074

(22) Filed: Jul. 7, 2022

(65) Prior Publication Data
US 2023/0387836 A1 Nov. 30, 2023

(30) Foreign Application Priority Data

May 25, 2022 (TW) .................................. 111119411

(51) Int. Cl.
| | |
|---|---|
| *H02P 6/08* | (2016.01) |
| *H02K 11/33* | (2016.01) |
| *H02P 6/20* | (2016.01) |

(52) U.S. Cl.
CPC ............... *H02P 6/08* (2013.01); *H02K 11/33* (2016.01); *H02P 6/20* (2013.01); *H02P 2209/11* (2013.01); *H02P 2209/13* (2013.01)

(58) Field of Classification Search
CPC .......... H02P 6/08; H02P 6/20; H02P 2209/11; H02P 2209/13; H02K 11/33
USPC ....................................................... 318/700
See application file for complete search history.

(56) References Cited

U.S. PATENT DOCUMENTS

2019/0319562 A1* 10/2019 Narumi .................... H02P 6/28

OTHER PUBLICATIONS

Hashimoto et al. (JP 2012117978 A) Power Waveform Display System Date Published Jun. 21, 2012 (Year: 2012).*

* cited by examiner

*Primary Examiner* — Jorge L Carrasquillo
(74) *Attorney, Agent, or Firm* — Li & Cai Intellectual Property Office

(57) ABSTRACT

A motor driver having a startup adjusting mechanism is provided. A steady-state detector circuit detects data for driving a motor to stably rotate to output a steady-state detected signal. A startup waveform pattern circuit selects one of a plurality of startup waveform patterns to output a startup waveform pattern signal according to the steady-state detected signal. A startup waveform generator circuit outputs a startup waveform signal according to the startup waveform pattern signal. A motor controlling circuit controls a motor driving circuit to start up the motor according to the startup waveform signal.

11 Claims, 9 Drawing Sheets

MOTOR DRIVER HAVING STARTUP ADJUSTING MECHANISM

CROSS-REFERENCE TO RELATED PATENT APPLICATION

This application claims the benefit of priority to Taiwan Patent Application No. 111119411, filed on May 25, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor, and more particularly to a motor driver having a startup adjusting mechanism.

BACKGROUND OF THE DISCLOSURE

In electronic devices, fans are used to cool heat generating components such as processors. When the heat generating components are cooled down by the fans, data from circuits of the fans must be instantly obtained so as to precisely control rotational speeds of motors of the fans according to the obtained data, such that the fans can properly cool down the heat generating components with efficiency.

However, a conventional motor driver always outputs a same startup driving signal, such as a first startup driving signal PN01 as shown in FIG. 9, to the motor to start up the motor, regardless of a target rotational speed of the motor. When the target rotational speed of the motor is a low rotational speed, (peak) values of waveforms of the first startup driving signal PN01 are too large for the target rotational speed. Therefore, after the motor is started up according to the first startup driving signal PN01, an actual rotational speed of the motor is higher than the target rotational speed. Then, the conventional motor driver must output a first steady-state waveform signal TN02 as shown in FIG. 9 to the motor to gradually decrease the actual rotational speed of the motor back to the target rotational speed during a time Tloss that is additionally consumed in a steady-state time interval.

Alternatively, the conventional motor driver always outputs a first startup driving signal PN02 as shown in FIG. 10 to the motor to start up the motor. When the target rotational speed of the motor is a high rotational speed, (peak) values of waveforms of the first startup driving signal PN02 are too small for the target rotational speed. Therefore, after the motor is started up according to the first startup driving signal PN02, the actual rotational speed of the motor is lower than the target rotational speed. Then, the conventional motor driver must output a first steady-state waveform signal TN22 as shown in FIG. 10 to the motor to gradually increase the actual rotational speed of the motor to the target rotational speed during a time Tloss2 that is additionally consumed in the steady-state time interval.

SUMMARY OF THE DISCLOSURE

In response to the above-referenced technical inadequacies, the present disclosure provides a motor driver having a startup adjusting mechanism. The motor driver is applicable to a motor. The motor driver includes a steady-state detector circuit, a startup waveform pattern circuit, a startup waveform generator circuit, a motor controlling circuit, and a motor driving circuit. The steady-state detector circuit is connected to the motor. The steady-state detector circuit is configured to detect data for driving the motor to rotate stably to output a steady-state detected signal in a pre-operation. The startup waveform pattern circuit is connected to the steady-state detector circuit. The startup waveform pattern circuit is configured to store a plurality of startup waveform patterns. The startup waveform pattern circuit is configured to select one of the plurality of startup waveform patterns according to the steady-state detected signal. The startup waveform pattern circuit is configured to output a startup waveform pattern signal according to the one of the plurality of startup waveform patterns that is selected. The startup waveform generator circuit is connected to the startup waveform pattern circuit. The startup waveform generator circuit is configured to determine a plurality of waveforms of a first startup waveform signal. The startup waveform generator circuit is configured to output the first startup waveform signal according to a plurality of waveforms of the startup waveform pattern signal. The motor controlling circuit is connected to the startup waveform generator circuit. The motor controlling circuit is configured to output a startup controlling signal according to the first startup waveform signal. The motor controlling circuit is configured to output a steady-state controlling signal. The motor driving circuit is connected to the motor controlling circuit and the motor. The motor driving circuit is configured to output a startup driving signal to the motor to start up the motor according to the startup controlling signal. The motor driving circuit is configured to output a steady-state driving signal to the motor to drive the motor to rotate stably, according to the steady-state controlling signal after the motor is started up.

In certain embodiments, the motor driving circuit outputs the steady-state driving signal, according to the steady-state controlling signal and a first steady-state waveform signal generated by the startup waveform generator circuit. The steady-state detector circuit detects a plurality of waveforms of the first steady-state waveform signal or the steady-state driving signal to output the steady-state detected signal.

In certain embodiments, the steady-state detector circuit is configured to detect duty cycles of the plurality of waveforms of the first steady-state waveform signal or the steady-state driving signal to output the steady-state detected signal.

In certain embodiments, the steady-state detector circuit is configured to detect values of the plurality of waveforms of the first steady-state waveform signal or the steady-state driving signal to output the steady-state detected signal.

In certain embodiments, the steady-state detector circuit is configured to detect a peak value of a latest one of the plurality of waveforms of the first steady-state waveform signal or the steady-state driving signal to output the steady-state detected signal.

In certain embodiments, a latest one or later ones of a plurality of waveforms of the one of the plurality of startup waveform patterns that is selected by the startup waveform pattern circuit are the same as one of the plurality of waveforms of the first steady-state waveform signal.

In certain embodiments, the plurality of startup waveform patterns stored in the startup waveform pattern circuit include a first startup waveform pattern and a second startup waveform pattern. When the data detected by the steady-state detector circuit is larger than a threshold, the startup waveform pattern circuit selects the first startup waveform pattern from the plurality of startup waveform patterns. When the data detected by the steady-state detector circuit is not larger than the threshold, the startup waveform pattern circuit selects the second startup waveform pattern from the plurality of startup waveform patterns.

In certain embodiments, when a target rotational speed of the motor is larger, waveforms of the one of the plurality of startup waveform patterns that is selected by the startup waveform pattern circuit have larger peak values or amplitudes.

In certain embodiments, in each of the plurality of startup waveform patterns, a peak value or an amplitude of each one of a plurality of waveforms is larger than that of an earlier one of the plurality of waveforms.

In certain embodiments, the startup waveform generator circuit compares values of the first startup waveform signal with values of a second startup waveform signal respectively at a plurality of time points to determine a plurality of duty cycles respectively of a plurality of waveforms of the startup controlling signal.

In certain embodiments, the plurality of waveforms of the first startup waveform signal include sinusoidal waveforms, third harmonic waveforms or a combination thereof. A plurality of waveforms of the second startup waveform signal include triangle waveforms, sawtooth waveforms or a combination thereof.

As described above, the present disclosure provides the motor driver having the startup adjusting mechanism. The motor driver of the present disclosure detects data for driving the motor to stably rotate and determines the waveforms of the startup driving signal according to the detected data. The motor driver of the present disclosure outputs the startup driving signal to the motor to start up the motor. As a result, current signals and voltage signals of the motor being started up by the motor driver of the present disclosure can be prevented from overshooting. Therefore, the rotational speed of the motor can be quickly increased to reach the target rotational speed so that energy is not wasted.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
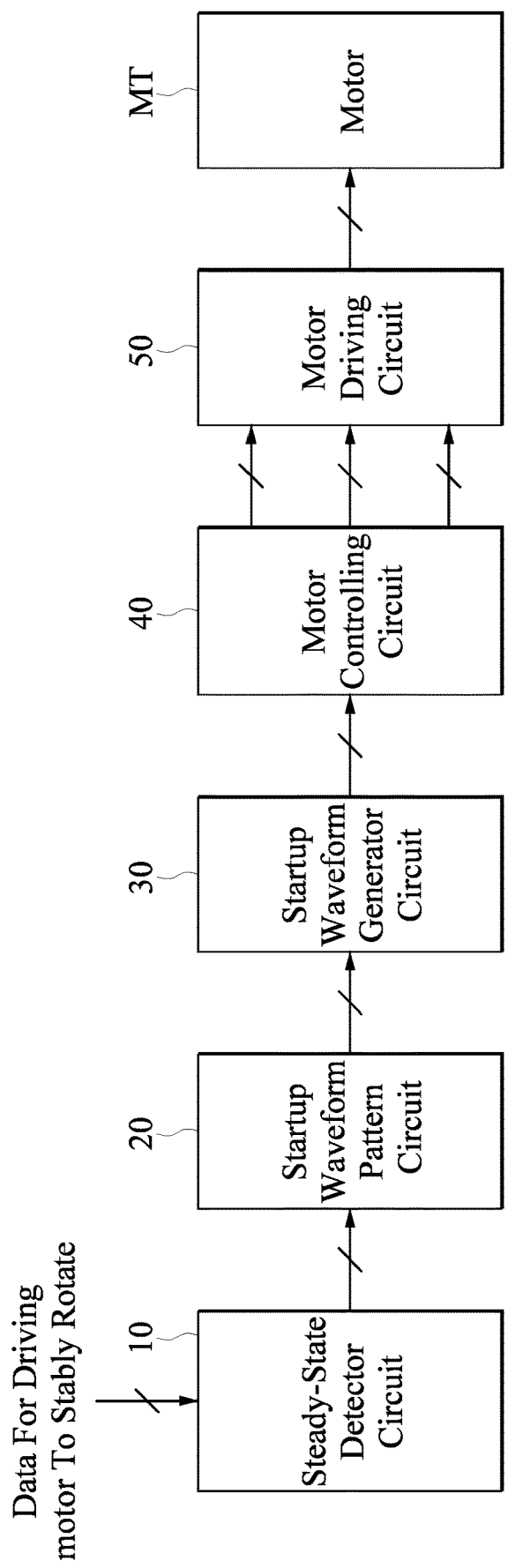
FIG. 1 is a block diagram of a motor driver having a startup adjusting mechanism according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
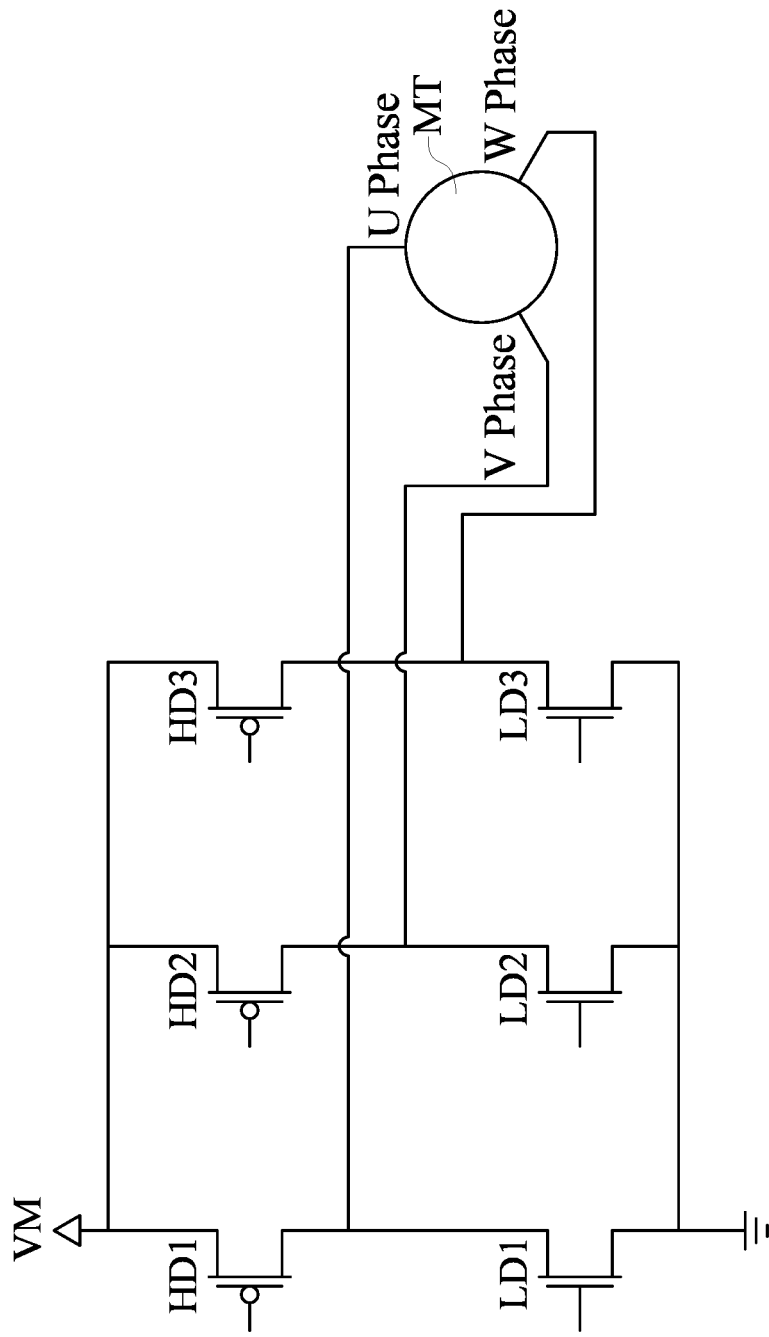
FIG. 2 is a circuit diagram of a motor and a motor driving circuit of the motor driver having the startup adjusting mechanism according to the embodiment of the present disclosure.

Reference is made to FIGS. 1 and 2, in which FIG. 1 is a block diagram of a motor driver having a startup adjusting mechanism according to an embodiment of the present disclosure, and FIG. 2 is a circuit diagram of a motor and a motor driving circuit of the motor driver having the startup adjusting mechanism according to the embodiment of the present disclosure.

The motor driver of the embodiment of the present disclosure may include a steady-state detector circuit 10, a startup waveform pattern circuit 20, a startup waveform generator circuit 30, a motor controlling circuit 40 and a motor driving circuit 50 as shown in FIG. 1.

The startup waveform pattern circuit 20 may be connected to the steady-state detector circuit 10 and the startup waveform generator circuit 30. The motor controlling circuit 40 may be connected to the startup waveform generator circuit 30 and the motor driving circuit 50. The motor driving circuit 50 may be connected to a motor MT.

The steady-state detector circuit 10 may be connected to the motor MT. In a pre-operation, the steady-state detector circuit 10 may detect data for driving the motor MT to rotate stably to output a steady-state detected signal.

The startup waveform pattern circuit 20 may store a plurality of startup waveform patterns. When the startup waveform pattern circuit 20 receives the steady-state detected signal from the steady-state detector circuit 10, the startup waveform pattern circuit 20 may select one of the plurality of startup waveform patterns to output a startup waveform pattern signal according to the steady-state detected signal.

The startup waveform generator circuit 30 may determine a plurality of waveforms of a first startup waveform signal and may output the first startup waveform signal to the motor controlling circuit 40, according to a plurality of waveforms of the startup waveform pattern signal from the startup waveform pattern circuit 20.

The motor controlling circuit 40 may output a startup controlling signal to the motor driving circuit 50 according to the first startup waveform signal from the startup waveform generator circuit 30. The motor driving circuit 50 may output a startup driving signal to the motor MT to start up the motor MT according to the startup controlling signal within a startup time interval.

After the motor MT is started up within the startup time interval, the motor driving circuit 50 may output a steady-state controlling signal to the motor driving circuit 50 within a steady-state time interval. The motor driving circuit 50 may, according to the steady-state controlling signal, output a steady-state driving signal to the motor MT to drive the motor MT to rotate stably. A rotational speed of the motor MT is quickly increased to reach a target rotational speed and maintained at the target rotational speed according to the steady-state driving signal.

In detail, the startup waveform generator circuit 30 may generate a first steady-state waveform signal. A plurality of waveforms of the first steady-state waveform signal may include sinusoidal waveforms, third harmonic waveforms or a combination thereof. If necessary, the startup waveform generator circuit 30 may generate a second steady-state waveform signal. A plurality of waveforms of the second steady-state waveform signal may include triangle waveforms, sawtooth waveforms or a combination thereof.

The motor driving circuit 50 may output the steady-state driving signal to the motor MT to drive the motor MT to stably rotate, according to the steady-state controlling signal from the motor controlling circuit 40, the first steady-state waveform signal and the second steady-state waveform signal.

The steady-state detector circuit 10 may be connected to the motor driving circuit 50 or the startup waveform generator circuit 30. In the pre-operation, the steady-state detector circuit 10 may detect data such as duty cycles and values of one or more of a plurality of waveforms of the steady-state driving signal or the first steady-state waveform signal to output the steady-state detected signal. The steady-state detector circuit 10 may only detect the peak value of a latest one of the plurality of waveforms of the first steady-state waveform signal.

In detail, the motor driving circuit 50 may include a bridge circuit. The bridge circuit may include a plurality of switch components. The switch components may include a plurality of high-side switches such as a first high-side switch HD1, a second high-side switch HD2 and a third high-side switch HD3 as shown in FIG. 2, and a plurality of low-side switches such as a first low-side switch LD1, a second low-side switch LD2 and a third low-side switch LD3 as shown in FIG. 2.

A first terminal of the first high-side switch HD1, a first terminal of the second high-side switch HD2 and a first terminal of the third high-side switch HD3 may be coupled to a common voltage VM. A second terminal of the first high-side switch HD1 may be connected to a first terminal of the first low-side switch LD1. A second terminal of the second high-side switch HD2 may be connected to a first terminal of the second low-side switch LD2. A second terminal of the third high-side switch HD3 may be connected to a first terminal of the third low-side switch LD3. A second terminal of the first low-side switch LD1, a second terminal of the second low-side switch LD2 and a second terminal of the third low-side switch LD3 may be grounded.

A node between the second terminal of the first high-side switch HD1 and the first terminal of the first low-side switch LD1 may be connected to a first terminal such as a U-phase terminal of the motor MT. A node between the second terminal of the second high-side switch HD2 and the first terminal of the second low-side switch LD2 may be connected to a second terminal such as a V-phase terminal of the motor MT. A node between the second terminal of the third high-side switch HD3 and the first terminal of the third low-side switch LD3 may be connected to a third terminal such as a W-phase terminal of the motor MT.

The motor control circuit 40 may be connected to a control terminal of each of the high-side switches and the low-side switches of the motor driving circuit 50. The motor control circuit 40 may turn on or off each of the high-side switches and the low-side switches.

The motor control circuit 40 may output the startup controlling signal to the control terminals of the switch components of the motor driving circuit 50 to control the switch components to start up the motor MT. After the motor MT is started up, the motor control circuit 40 may output the steady-state controlling signal to the control terminals of the switch components to control the switch components to drive the motor MT to rotate stably.

Figure 3:
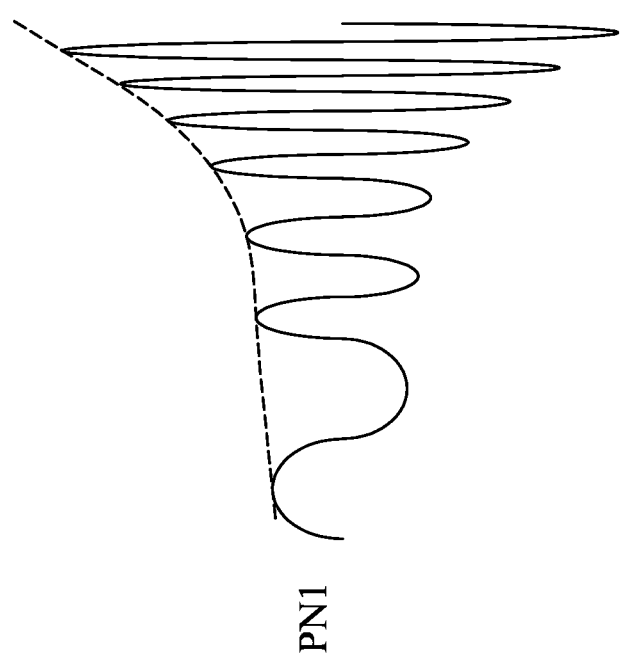
FIG. 3 is a waveform diagram of a signal of the motor driver having the startup adjusting mechanism according to the embodiment of the present disclosure.
Figure 4:
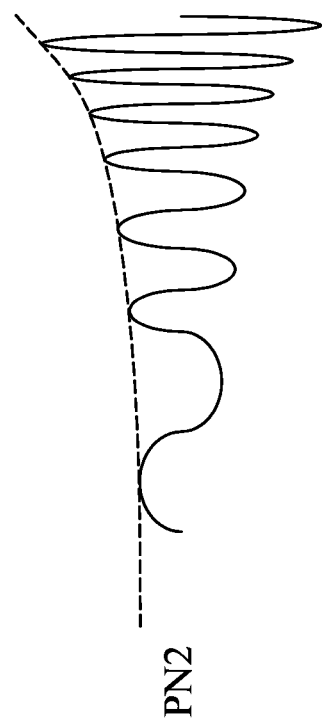
FIG. 4 is a waveform diagram of a signal of the motor driver having the startup adjusting mechanism according to the embodiment of the present disclosure.

Reference is made to FIGS. 1, 3 and 4, in which FIG. 1 is a block diagram of a motor driver having a startup adjusting mechanism according to an embodiment of the present disclosure, FIGS. 3 and 4 are waveform diagrams of signals of the motor driver having the startup adjusting mechanism according to the embodiment of the present disclosure.

The startup waveform pattern circuit 20 as shown in FIG. 1 may store a plurality of startup waveform patterns such as a first startup waveform pattern PN1 as shown in FIG. 3 and a second startup waveform pattern PN2 as shown in FIG. 4, but the present disclosure is not limited thereto.

As shown in FIG. 3, (peak or amplitude) values of some or all of a plurality of waveforms of the first startup waveform pattern PN1 may be different from each other. As shown in FIG. 4, (peak or amplitude) values of some or all of a plurality of waveforms of the second startup waveform pattern PN2 may be different from each other.

As shown in FIG. 3, the (peak or amplitude) value of each one of the plurality of waveforms of the first startup waveform pattern PN1 is larger than that of an earlier one of the plurality of waveforms of the first startup waveform pattern PN1. As shown in FIG. 4, the (peak or amplitude) value of each one of the plurality of waveforms of the second startup waveform pattern PN2 is larger than that of an earlier one of the plurality of waveforms of the second startup waveform pattern PN2.

In other words, in the plurality of waveforms of each of the startup waveform patterns (such as the first startup waveform pattern PN1 as shown in FIG. 3 and the second startup waveform pattern PN2 as shown in FIG. 4), the later the waveform is generated, the larger the peak value of the waveform is, and the peak value of the waveform is more approximate to a peak value of each of the waveforms of the first steady-state waveform signal.

The peak values of the waveforms of the first startup waveform pattern PN1 at a plurality of time points as shown in FIG. 3 are respectively larger than the peak values of the waveforms of the second startup waveform pattern PN2 at the plurality of time points as shown in FIG. 4. The amplitudes of the waveforms of the first startup waveform pattern PN1 at a plurality of time points as shown in FIG. 3 are respectively larger than the amplitudes of the waveforms of the second startup waveform pattern PN2 at the plurality of time points as shown in FIG. 4.

Therefore, the first startup waveform pattern PN1 as shown in FIG. 3 is suitable for use in starting up the motor MT before the motor MT is driven to rotate stably at a relatively high target rotational speed. In contrast, the second startup waveform pattern PN2 as shown in FIG. 4 is suitable for use in starting up the motor MT before the motor MT is driven to rotate stably at a relatively low target rotational speed.

When the steady-state detector circuit 10 determines that the detected data (such as the duty cycle, the peak value or other values of the first steady-state waveform signal as described above) is larger than a threshold, the startup waveform pattern circuit 20 may select one of the plurality of startup waveform patterns such as the first startup waveform pattern PN1 that has the larger peak value or the larger amplitude as shown in FIG. 3, according to the steady-state detected signal from the steady-state detector circuit 10.

Conversely, when the steady-state detector circuit 10 determines that the detected data is not larger than the threshold, the startup waveform pattern circuit 20 may select one of the plurality of startup waveform patterns such as the second startup waveform pattern PN2 that has the smaller peak value or the smaller amplitude as shown in FIG. 4, according to the steady-state detected signal from the steady-state detector circuit 10.

Figure 5:
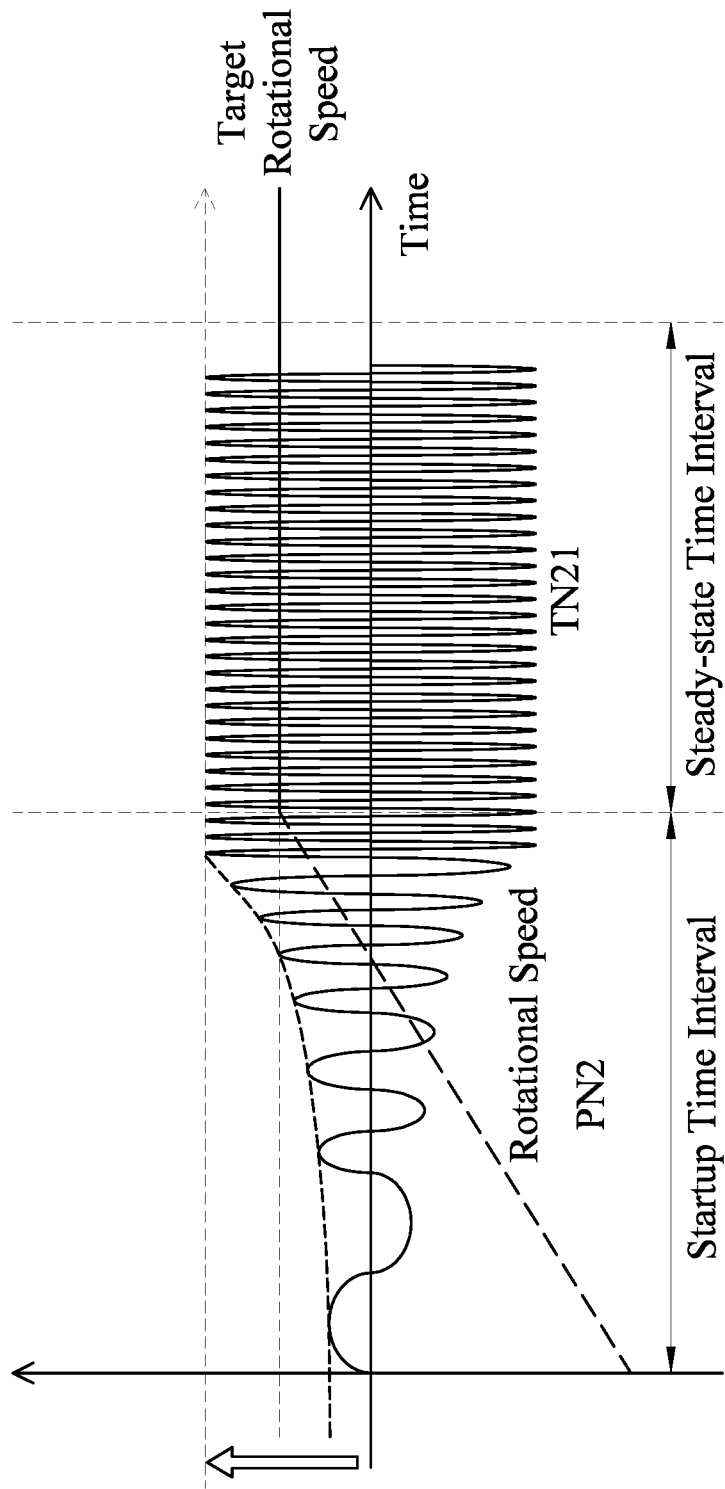
FIG. 5 is a waveform diagram of signals of the motor driver having the startup adjusting mechanism according to the embodiment of the present disclosure.

Reference is made to FIGS. 1 and 5, in which FIG. 1 is a block diagram of a motor driver having a startup adjusting mechanism according to an embodiment of the present disclosure, and FIG. 5 is a waveform diagram of signals of the motor driver having the startup adjusting mechanism according to the embodiment of the present disclosure.

The startup waveform pattern circuit 20 as shown in FIG. 1 may select the second startup waveform pattern PN2 shown in FIG. 5. As shown in FIG. 5, (the peak values, the amplitudes and duty cycles of) a latest one or later ones of the plurality of waveforms of the second startup waveform pattern PN2 are (those of) each one, an earliest one, earlier ones of a plurality of waveforms of a first steady-state waveform signal TN21.

The motor control circuit 40 as shown in FIG. 1 may output the startup controlling signal according to the second startup waveform pattern PN2. Then, the motor driving circuit 50 as shown in FIG. 1 outputs the startup driving signal to the motor MT to start up the motor MT according to the startup controlling signal within the startup time interval. As a result, as shown in FIG. 5, the rotational speed of the motor MT is linearly and rapidly increased to reach the target rotational speed and is maintained at the target rotational speed within the steady-state time interval.

Figure 6:
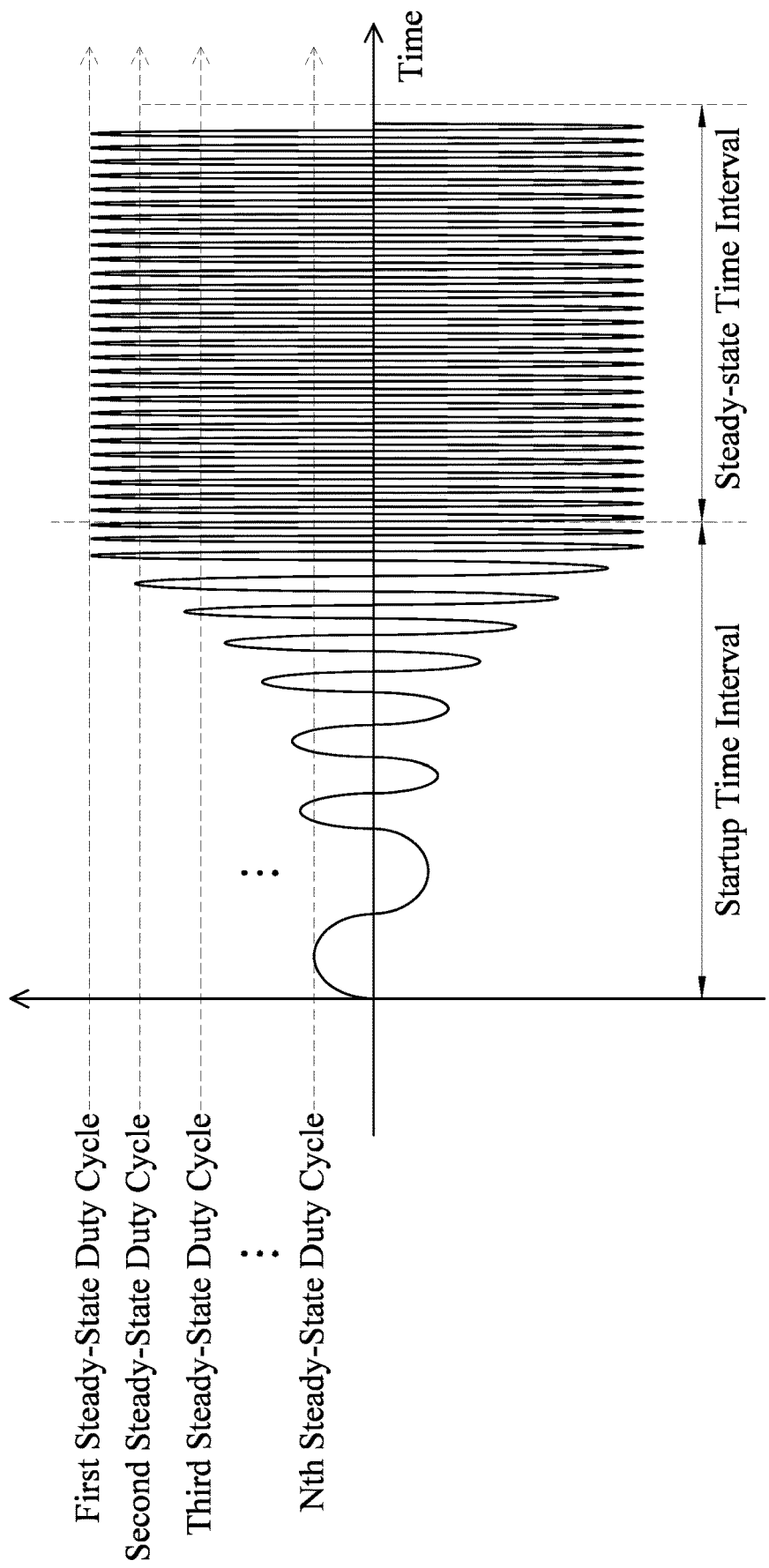
FIG. 6 is a waveform diagram of signals of the motor driver having the startup adjusting mechanism according to the embodiment of the present disclosure.
Figure 7:
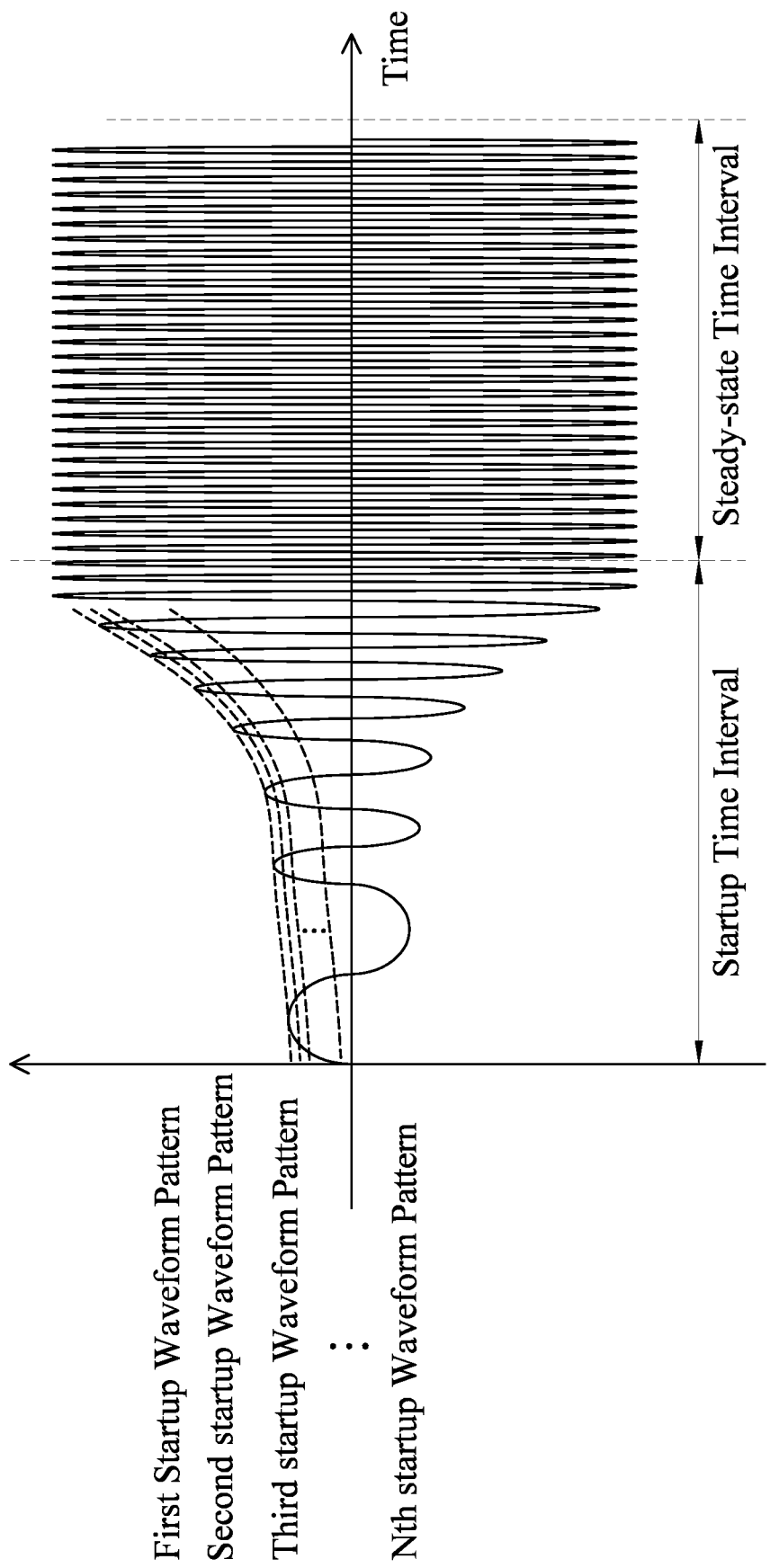
FIG. 7 is a waveform diagram of signals of the motor driver having the startup adjusting mechanism according to the embodiment of the present disclosure.

Reference is made to FIGS. 1, 5 and 7, in which FIG. 1 is a block diagram of a motor driver having a startup adjusting mechanism according to an embodiment of the present disclosure, and FIGS. 5 to 7 are waveform diagrams of signals of the motor driver having the startup adjusting mechanism according to the embodiment of the present disclosure.

When the steady-state detector circuit 10 as shown in FIG. 1 detects the steady-state driving signal and determines that a duty cycle of the detected steady-state driving signal is small, for example, is not larger than a duty cycle threshold, the latest one of the plurality of waveforms of the second startup waveform pattern PN2 selected by the startup waveform pattern circuit 20 shown in FIG. 1 is the same as each one of the plurality of waveforms of the first steady-state waveform signal TN21. As a result, after the motor MT is started up, the rotational speed of the motor MT is quickly increased to reach the target rotational speed and is maintained at the target rotational speed within the steady-state time interval.

Conversely, the steady-state detector circuit 10 as shown in FIG. 1 detects the steady-state driving signal and determines that the duty cycle of the detected steady-state driving signal is large, for example, is larger than the duty cycle threshold. Under this condition, among the plurality of waveforms of the second startup waveform pattern PN2 selected by the startup waveform pattern circuit 20 shown in FIG. 1, the later the waveform is generated, the larger the peak value of the waveform is, and the closer the peak value of the waveform is to the peak value of the earliest one of the plurality of waveforms of the first steady-state waveform signal TN21. As a result, the rotational speed of the motor MT is quickly increased to reach the target rotational speed and is maintained at the target rotational speed.

The startup waveform pattern circuit 20 as shown in FIG. 1 may store the plurality of the startup waveform patterns, but the present disclosure is not limited to the number of the startup waveform patterns. The startup waveform pattern as shown in FIG. 6 may be one of the startup waveform patterns stored in the startup waveform pattern circuit 20. The peak value of each one of the plurality of startup waveform patterns is different from the peak value of another one of the plurality of startup waveform patterns. The plurality of the startup waveform patterns respectively correspond to a plurality of steady-state duty cycles. The plurality of steady-state duty cycles respectively correspond to a plurality of target rotational speeds of the motor MT.

Figure 8:
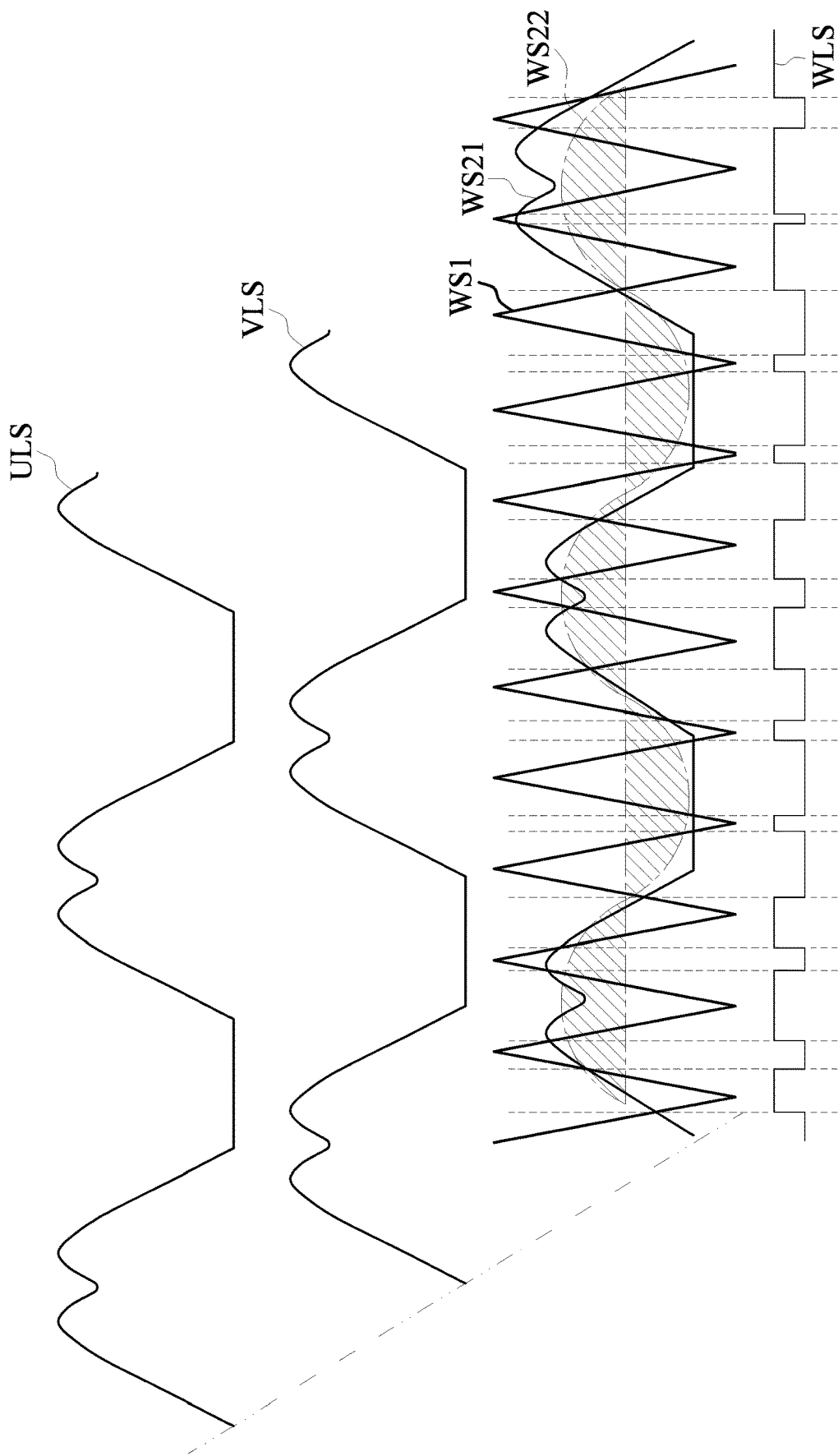
FIG. 8 is a waveform diagram of signals of the motor driver having the startup adjusting mechanism according to the embodiment of the present disclosure.
Figure 9:
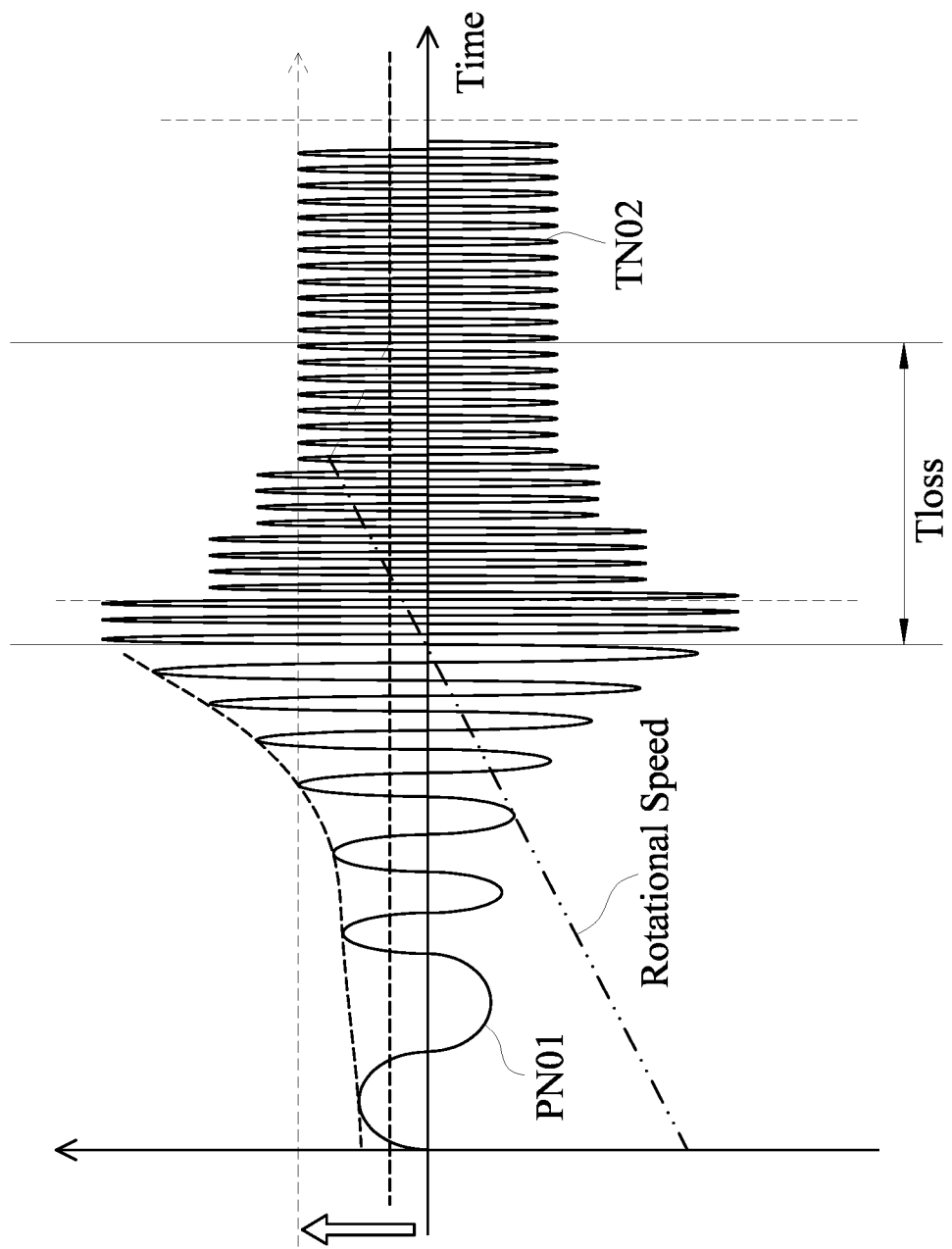
FIG. 9 is a waveform diagram of signals of a conventional motor driver.
Figure 10:
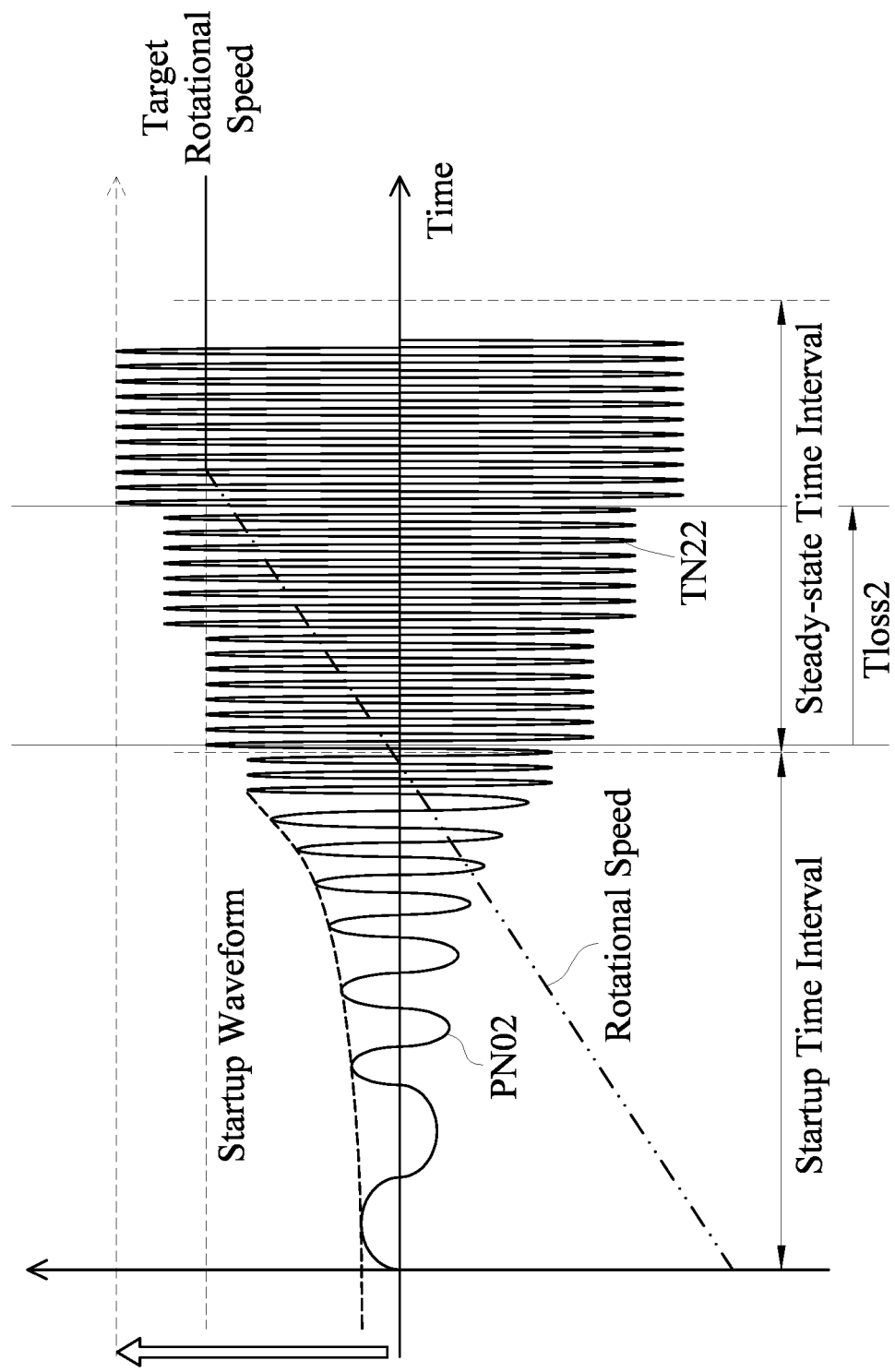
FIG. 10 is a waveform diagram of signals of the conventional motor driver.

Reference is made to FIGS. 1, 2 and 8, in which FIG. 1 is a block diagram of a motor driver having a startup adjusting mechanism according to an embodiment of the present disclosure, FIG. 2 is a circuit diagram of a motor and a motor driving circuit of the motor driver having the startup adjusting mechanism according to the embodiment of the present disclosure, and FIG. 8 is a waveform diagram of signals of the motor driver having the startup adjusting mechanism according to the embodiment of the present disclosure.

The waveforms of each of the startup waveform patterns stored in the startup waveform pattern circuit 20 shown in FIG. 1 may include sinusoidal waveforms such as the sinusoidal waveforms of the first startup waveform pattern PN1 as shown in FIG. 3 or the second startup waveform pattern PN2 as shown in FIG. 4.

Alternatively, the waveforms of each of the startup waveform patterns stored in the startup waveform pattern circuit 20 shown in FIG. 1 may include third harmonic waveforms.

The startup waveform generator circuit 30 as shown in FIG. 1, according to the startup waveform pattern, outputs a first startup waveform signal having a plurality of waveforms that are the same as that of the startup waveform pattern. For example, the startup waveform generator circuit 30 may output a first start-up waveform signal WS22 having a plurality of sinusoidal waveforms as shown in FIG. 8, or may output a first start-up waveform signal WS21 having a plurality of third harmonic waveforms as shown in FIG. 8, but the present disclosure is not limited thereto.

The startup waveform generator circuit 30 may compare (voltage) values of the first startup waveform signal WS21 with that of a second startup waveform signal WS1 to determine levels of a plurality of waveforms of a startup controlling signal WLS at a plurality of time points to determine duty cycles of the plurality of waveforms of the startup controlling signal WLS.

For example, the plurality of waveforms of the startup controlling signal WLS may include triangle waveforms as shown in FIG. 8, sawtooth waveforms, or a combination thereof, but present disclosure is not limited thereto.

The startup waveform generator circuit 30 as shown in FIG. 1 may output the startup controlling signal WLS to the control terminal of any one of the switch components of the motor driving circuit 50 such as, but not limited to, the control terminal of the third high-side switch HD3 connected to the W-phase terminal of the motor MT as shown in FIG. 2. An on-time of the third high-side switch HD3 is a time during which the startup controlling signal WLS is at a high level.

In addition, the startup waveform generator circuit 30 may, according to the first startup waveform signal WS21, output other startup controlling signals ULS and VLS to the control terminals of others of the switch components of the motor driving circuit 50. For example, the startup waveform generator circuit 30 may output the startup controlling signal ULS to the control terminal of the first high-side switch HD1 connected to the U-phase terminal of the motor MT, and may output the startup controlling signal VLS to the control terminal of the second high-side switch HD2 connected to the V-phase terminal of the motor MT as shown in FIG. 2, but the present disclosure is not limited thereto.

In conclusion, the present disclosure provides the motor driver having the startup adjusting mechanism. The motor driver of the present disclosure detects data for driving the motor to stably rotate and determines the waveforms of the startup driving signal according to the detected data. The motor driver of the present disclosure outputs the startup driving signal to the motor to start up the motor. As a result, current signals and voltage signals of the motor being started up by the motor driver of the present disclosure can be prevented from overshooting. Therefore, the rotational speed of the motor can be quickly increased to reach the target rotational speed so that energy is not wasted.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor driver having a startup adjusting mechanism, which is applicable to a motor, the motor driver comprising:
   a steady-state detector circuit connected to the motor, and configured to detect data for driving the motor to rotate stably for outputting a steady-state detected signal in a pre-operation;
   a startup waveform pattern circuit connected to the steady-state detector circuit, configured to store a plurality of startup waveform patterns, configured to select one of the plurality of startup waveform patterns according to the steady-state detected signal, and configured to output a startup waveform pattern signal according to the one of the plurality of startup waveform patterns that is selected;
   a startup waveform generator circuit connected to the startup waveform pattern circuit, configured to determine a plurality of waveforms of a first startup waveform signal, and configured to output the first startup waveform signal according to a plurality of waveforms of the startup waveform pattern signal;
   a motor controlling circuit connected to the startup waveform generator circuit, configured to output a startup controlling signal according to the first startup waveform signal, and configured to output a steady-state controlling signal; and
   a motor driving circuit connected to the motor controlling circuit and the motor, configured to output a startup driving signal to the motor to start up the motor according to the startup controlling signal, and configured to output a steady-state driving signal to the motor to drive the motor to rotate stably according to the steady-state controlling signal after the motor is started up.

2. The motor driver according to claim 1, wherein the motor driving circuit outputs the steady-state driving signal according to the steady-state controlling signal and a first steady-state waveform signal generated by the startup waveform generator circuit;
   wherein the steady-state detector circuit detects a plurality of waveforms of the first steady-state waveform signal or the steady-state driving signal to output the steady-state detected signal.

3. The motor driver according to claim 2, wherein the steady-state detector circuit is configured to detect duty cycles of the plurality of waveforms of the first steady-state waveform signal or the steady-state driving signal to output the steady-state detected signal.

4. The motor driver according to claim 2, wherein the steady-state detector circuit is configured to detect values of the plurality of waveforms of the first steady-state waveform signal or the steady-state driving signal to output the steady-state detected signal.

5. The motor driver according to claim 2, wherein the steady-state detector circuit is configured to detect a peak value of a latest one of the plurality of waveforms of the first steady-state waveform signal or the steady-state driving signal to output the steady-state detected signal.

6. The motor driver according to claim 2, wherein a latest one or later ones of a plurality of waveforms of the one of the plurality of startup waveform patterns that is selected by the startup waveform pattern circuit are the same as one of the plurality of waveforms of the first steady-state waveform signal.

7. The motor driver according to claim 1, wherein the plurality of startup waveform patterns stored in the startup waveform pattern circuit include a first startup waveform pattern and a second startup waveform pattern;
- wherein, when the data detected by the steady-state detector circuit is larger than a threshold, the startup waveform pattern circuit selects the first startup waveform pattern from the plurality of startup waveform patterns;
- wherein, when the data detected by the steady-state detector circuit is not larger than the threshold, the startup waveform pattern circuit selects the second startup waveform pattern from the plurality of startup waveform patterns.

8. The motor driver according to claim 1, wherein, when a target rotational speed of the motor is larger, waveforms of the one of the plurality of startup waveform patterns that is selected by the startup waveform pattern circuit have larger peak values or amplitudes.

9. The motor driver according to claim 1, wherein, in each of the plurality of startup waveform patterns, a peak value or an amplitude of each one of a plurality of waveforms is larger than a peak value or an amplitude of an earlier one of the plurality of waveforms.

10. The motor driver according to claim 1, wherein the startup waveform generator circuit compares values of the first startup waveform signal with values of a second startup waveform signal respectively at a plurality of time points to determine a plurality of duty cycles respectively of a plurality of waveforms of the startup controlling signal.

11. The motor driver according to claim 10, wherein the plurality of waveforms of the first startup waveform signal include sinusoidal waveforms, third harmonic waveforms or a combination thereof, and a plurality of waveforms of the second startup waveform signal include triangle waveforms, sawtooth waveforms or a combination thereof.

* * * * *